US010849309B2

(12) United States Patent
Fogle

(10) Patent No.: US 10,849,309 B2
(45) Date of Patent: Dec. 1, 2020

(54) COMBINED PET LITTER BOX AND CLEANING SIEVE

(71) Applicant: Eric Warren Fogle, Forestville, MD (US)

(72) Inventor: Eric Warren Fogle, Forestville, MD (US)

( * ) Notice: Subject to any disclaimer, the term of this patent is extended or adjusted under 35 U.S.C. 154(b) by 402 days.

(21) Appl. No.: 14/590,352

(22) Filed: Jan. 6, 2015

(65) Prior Publication Data

US 2015/0334982 A1 Nov. 26, 2015

Related U.S. Application Data

(60) Provisional application No. 61/997,168, filed on May 23, 2014.

(51) Int. Cl.
*A01K 1/01* (2006.01)

(52) U.S. Cl.
CPC .................... *A01K 1/0114* (2013.01)

(58) Field of Classification Search
CPC .... A01K 1/0114; A01K 1/0107; A01K 1/011; A01K 1/0132; A01K 23/005; E01H 1/1206; E01H 5/02; E01H 2001/1293
USPC ............. 294/176, 1.3, 179, 1.4, 181, 49, 60; 119/166, 165, 168, 161
See application file for complete search history.

(56) References Cited

U.S. PATENT DOCUMENTS

| | | | | | |
|---|---|---|---|---|---|
| 1,773,141 | A | * | 8/1930 | Hodgson | A01K 1/0107 119/165 |
| 3,111,932 | A | * | 11/1963 | Knutson | A01K 1/0107 119/165 |
| 3,851,763 | A | * | 12/1974 | Ball | B07B 1/02 209/419 |
| 4,029,048 | A | * | 6/1977 | Gershbein | A01K 1/0107 119/165 |
| 5,921,596 | A | * | 7/1999 | Sheriff | A01K 1/0114 209/418 |
| 6,820,628 | B2 | * | 11/2004 | Larson | A01B 1/02 135/66 |

(Continued)

OTHER PUBLICATIONS

Advertisement: http://www.amazon.com. Cats Rule Stand Up and Scoop Telescoping Litter Scoop by Cats Rule, May 17, 2016, 6 pages.

(Continued)

*Primary Examiner* — Peter M Poon
*Assistant Examiner* — Jeffrey R Larsen
(74) *Attorney, Agent, or Firm* — Breiner & Breiner, L.L.C.

(57) ABSTRACT

A combined litter box and cleaning sieve is provided including a base structure and a sieve member. The base structure includes a bottom wall and side wall(s) which extend upward from the base wall except in one portion to leave an open side for receiving the sieve member therethrough. The sieve member includes a back wall section for extending across the open side of the base structure, a screen portion and upstanding handle. In use, the sieve member is inserted in the base structure and litter filled on top thereof. The litter can be cleaned of waste by lifting the sieve member by the handle whereby clean litter sifts through the screen portion and waste is collected on the screen which can then be disposed of. Afterward, the empty sieve member is placed back into position through the receiving side of the base structure for further use.

12 Claims, 4 Drawing Sheets

(56) References Cited

U.S. PATENT DOCUMENTS

| | | | |
|---|---|---|---|
| 8,181,601 B2* | 5/2012 | Kratzer | A01K 1/0107 |
| | | | 119/161 |
| 8,336,497 B2* | 12/2012 | van Zuilekom | A01K 1/0107 |
| | | | 119/165 |
| 8,851,014 B2* | 10/2014 | Hecht | A01K 1/0114 |
| | | | 119/166 |
| 2004/0244708 A1* | 12/2004 | Neil | A01K 1/0125 |
| | | | 119/168 |
| 2007/0084413 A1 | 4/2007 | Oertel et al. | |
| 2007/0163508 A1 | 7/2007 | Gloor | |
| 2008/0164704 A1 | 7/2008 | Boskett et al. | |
| 2009/0199778 A1 | 8/2009 | Kratzer et al. | |
| 2012/0318203 A1 | 12/2012 | Andrade et al. | |
| 2013/0133585 A1 | 5/2013 | Hecht | |
| 2013/0319340 A1 | 12/2013 | Bellini et al. | |

OTHER PUBLICATIONS

Advertisement: http://www.etsy.com, StandNScoop Litter Box, Cat Scoop, May 17, 2016, 7 pages.

* cited by examiner

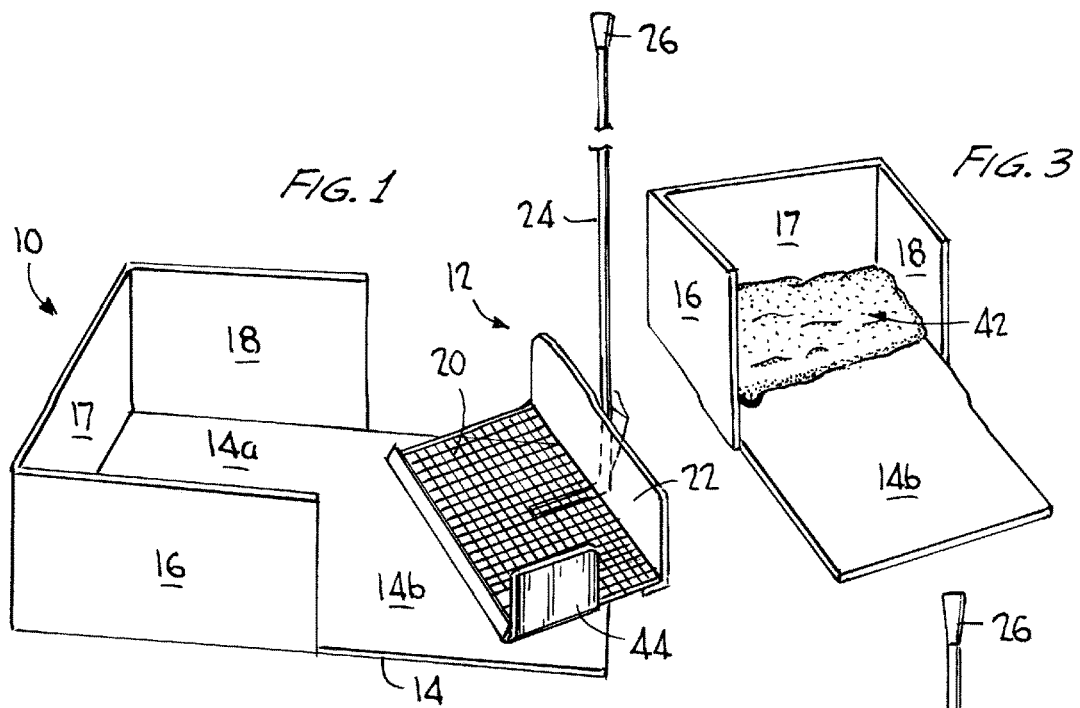
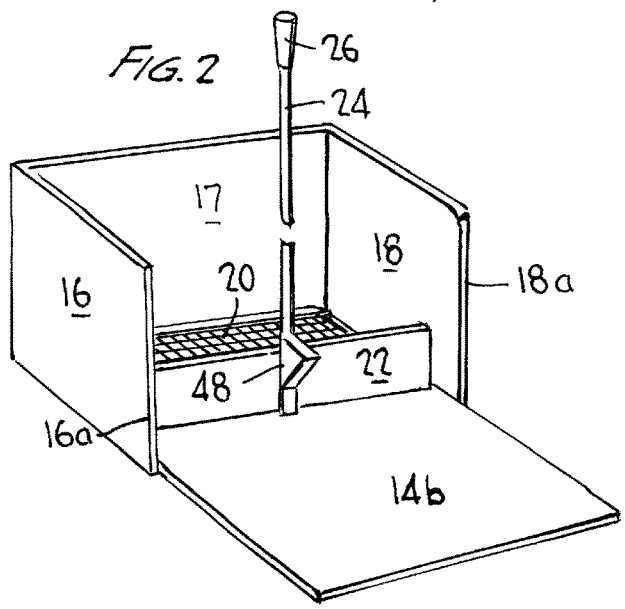
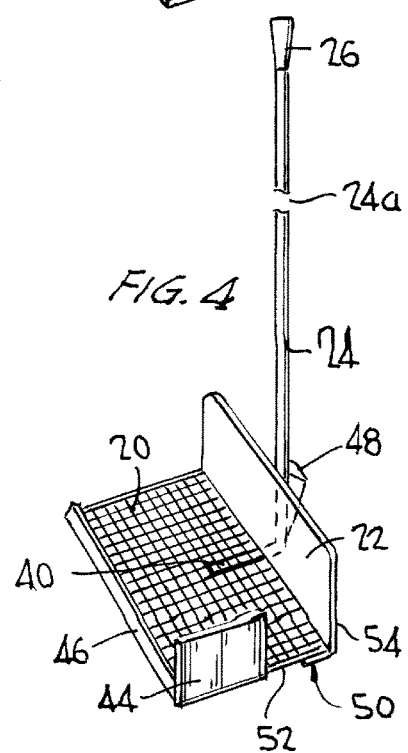
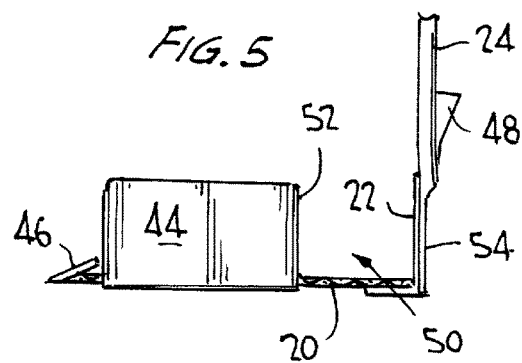

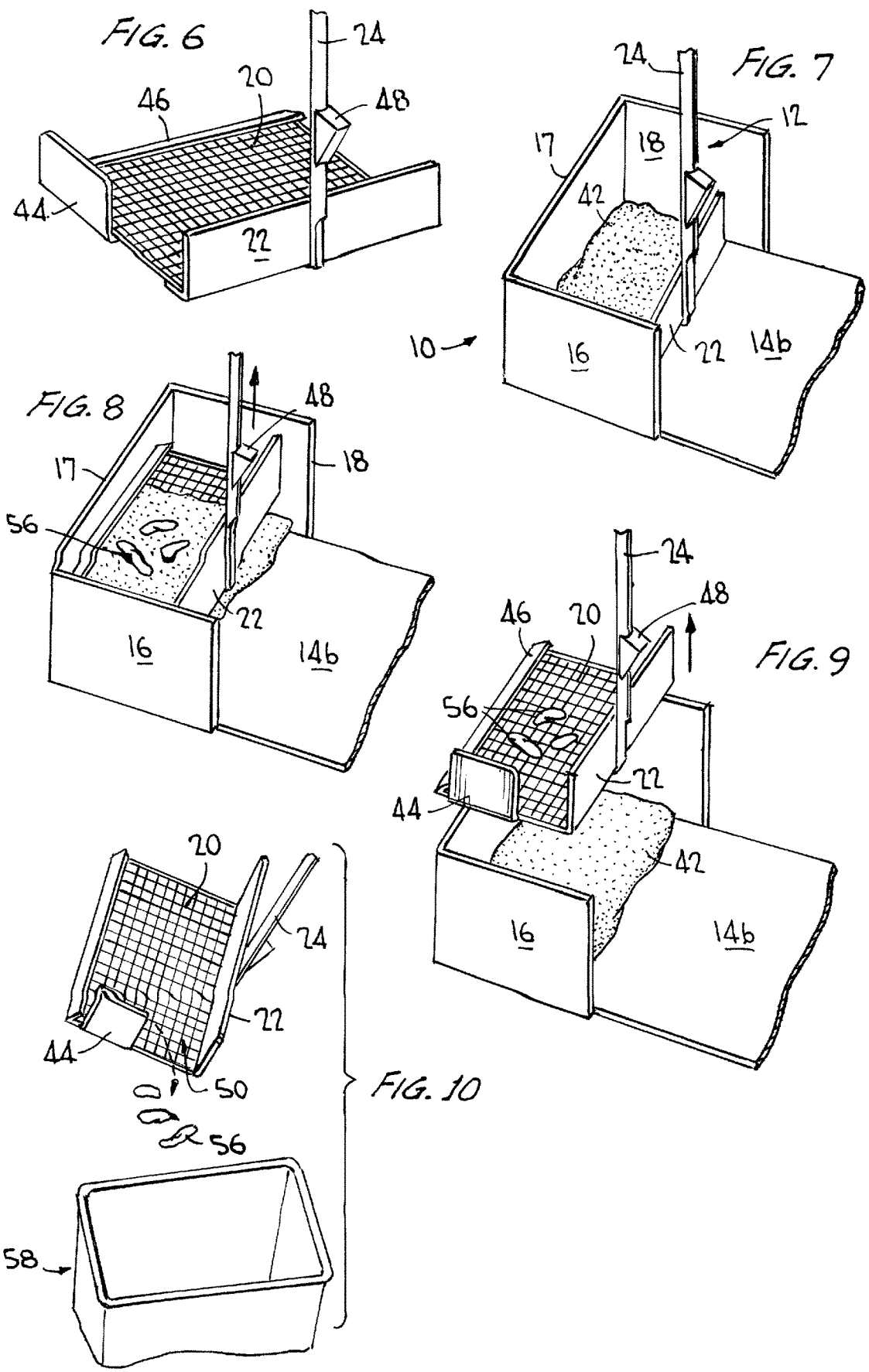

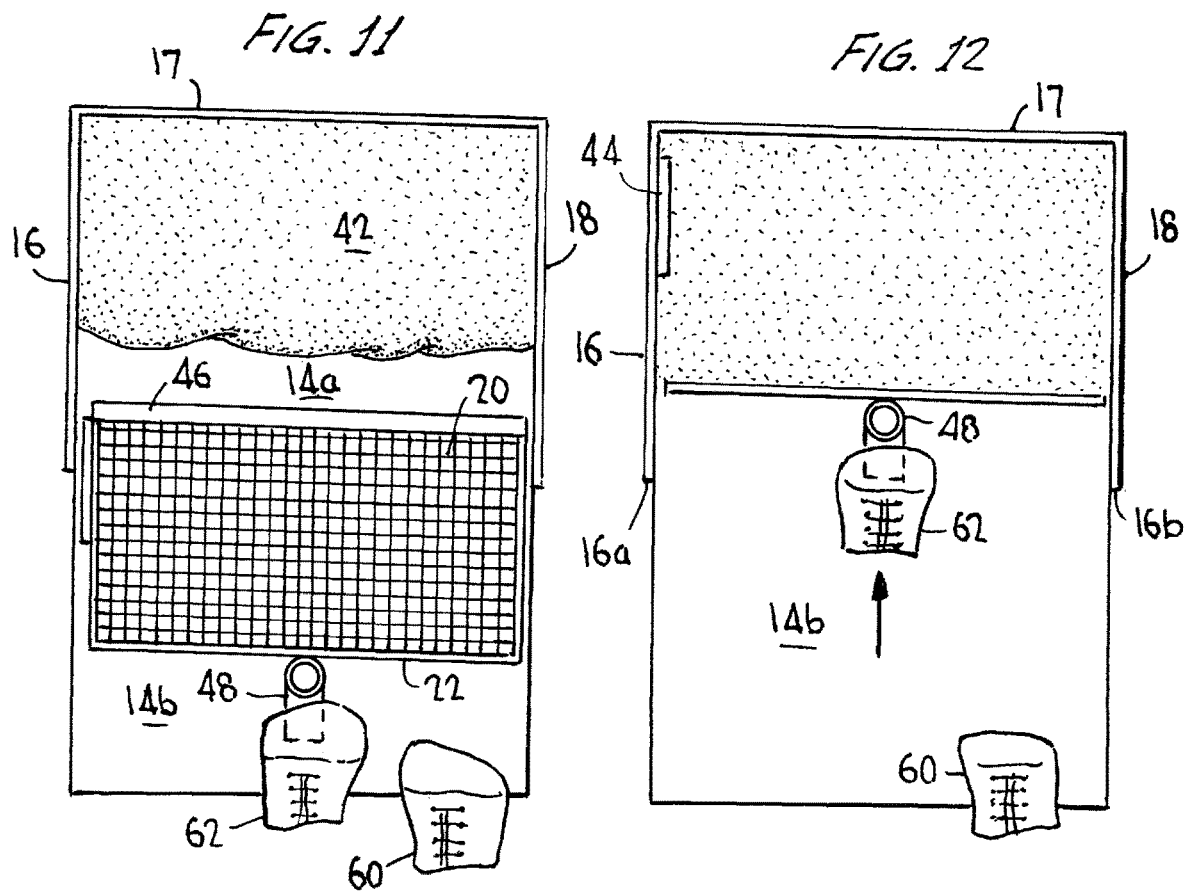
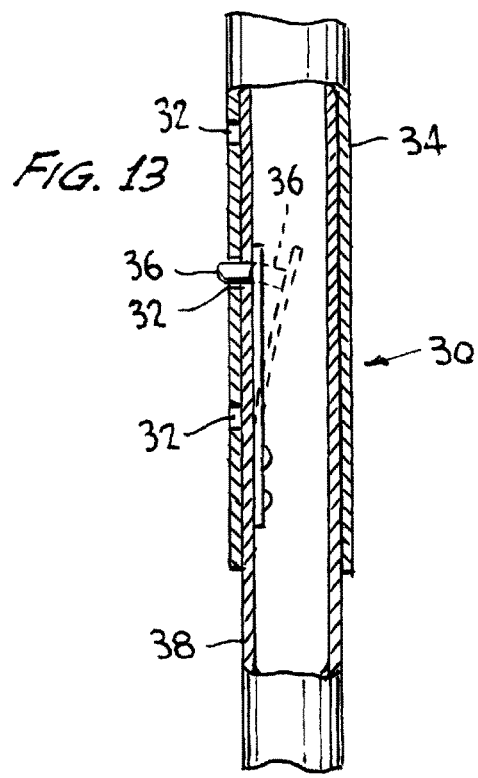

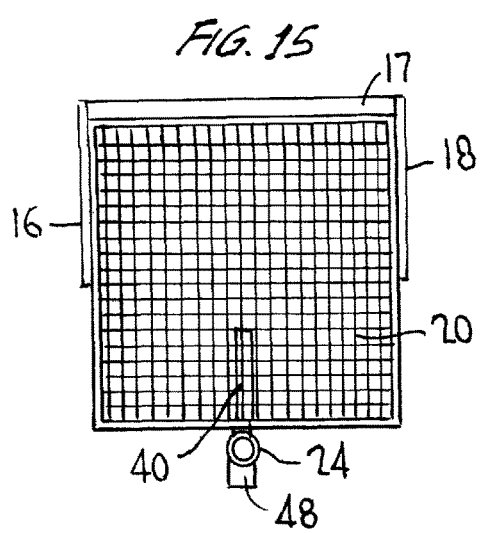
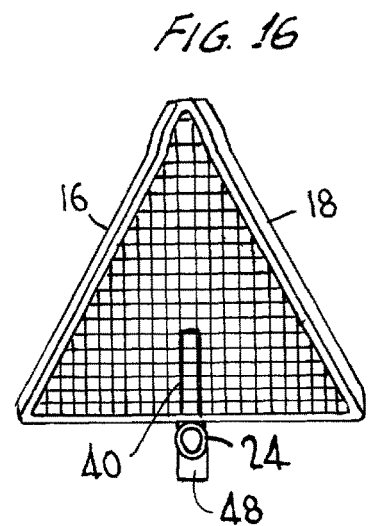
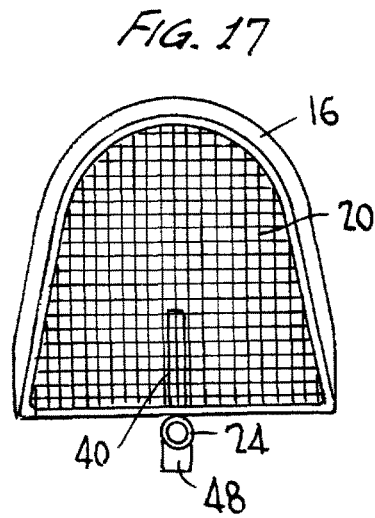
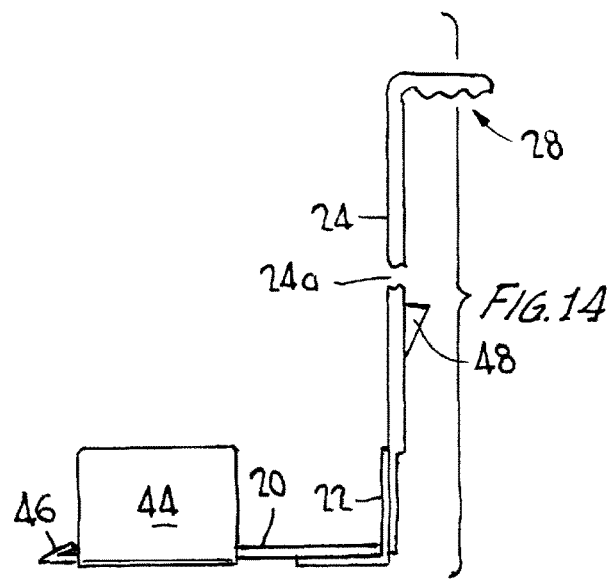
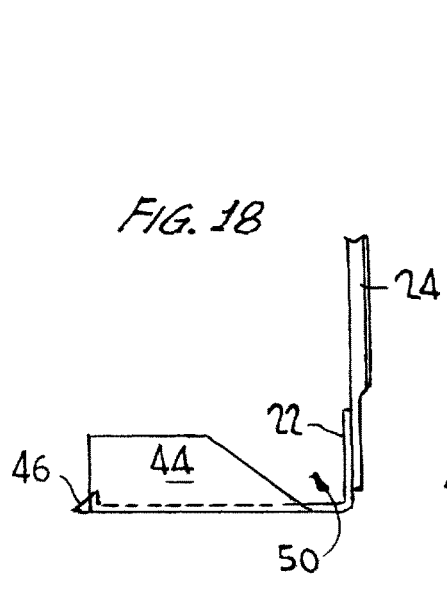
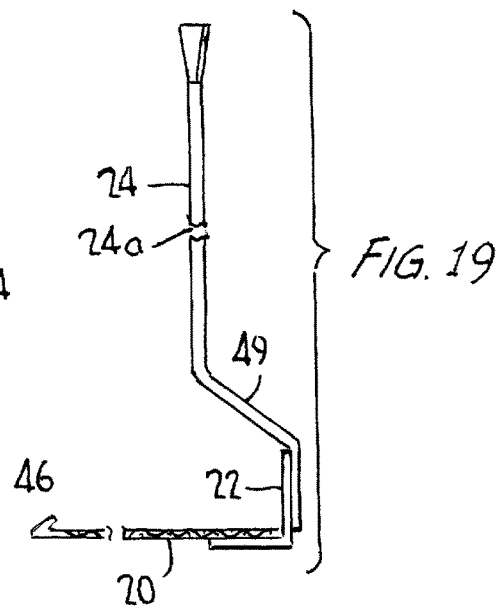

COMBINED PET LITTER BOX AND CLEANING SIEVE

RELATED APPLICATION

The present application claims benefit of U.S. Provisional Application Ser. No. 61/997,168 filed May 23, 2014 entitled "SAVVY SIEVE", which is incorporated herein by reference.

FIELD OF INVENTION

A pet litter box combined with a sieve for cleaning animal waste from the litter box is described. The litter box and sieve are arranged to be animal friendly to encourage use of the box, while minimalizing physical action necessary for cleaning waste from the litter box.

BACKGROUND OF THE INVENTION

Pet litter boxes are maintained in households for small pets (primarily cats, but also small dogs, rabbits, ferrets, or other pets of a size that instinctively or through training use a litter box) to allow for urination and excretion by a pet as needed by the pet without the necessity of going outside. Conventional litter boxes are open-top rectangular pans, i.e., containers with four side walls and a bottom wall which are filled with a litter material to absorb urine and cover the feces excreted (which for convenience will be referred to generally herein as "waste" or "waste product"). Numerous types of litter are sold commercially, including clay-based litter, clumping litter made of bentonite or diatomaceous earth or silica-based, biodegradable litter (pinewood pellets, recycled newspaper, barley, dried orange peels, etc.), and granular silicon dioxide. Conventional litter is sold in clumping and non-clumping styles. Due to the odors and visual nature of the waste product in the litter box, litter boxes are generally maintained on the floor in an out-of-the-way location. A hand scoop is used to remove waste from a conventional litter box. When not in use, the scoop is usually placed near the box on a piece of paper or the like (to avoid dirtying the surface) until next use. The location and use of a hand scoop (even if the hand scoop has an extended handle) can require uncomfortable physical exertion by a person when it is necessary to clean the litter box of waste, especially for a person of an older age or if disabled or of lesser strength. For most single cat households, removal of waste from a litter box usually is preferably done at least twice a day. Physical exertion that can create difficulty or discomfort is due to bending over the box, kneeling to avoid bending, and raking arm motions to move the litter to sift through the litter to locate and lift out the waste for placement in the trash. For an elderly or infirm person, this can be followed by a struggle to stand erect once finished cleaning the litter box. If the litter box is hooded, even more physical exertion is required to clean waste from the litter box.

While mechanized self-cleaning litter boxes are commercially available for automatic removal of waste from the litter, such are expensive, require electric or battery power (added expense), and/or water hook-up and/or purchase of disposable bags and are subject to not working as well as desired or of breaking down. Generally, over time, self-cleaning litter boxes will also require someone to kneel down or bend over to remove hidden waste that accumulates because such boxes do not result in 100% removal upon each automatic cleaning. Additionally, such mechanized litter boxes are generally covered and, thus, not liked by all pets and become a waste of money.

Therefore, a need exists for a litter box which can be readily cleaned with minimal physical motion or exertion, especially which does not require a person to bend over or kneel, while remaining animal friendly and inexpensive. The present invention provides for these features.

SUMMARY OF INVENTION

The invention is directed to an animal or pet litter box in combination with a cleaning sieve. In use, no bending or kneeling is required by a person to clean waste from the litter box using the sieve. Minimal manual motion and exertion is required.

The combined litter box and cleaning sieve includes a base structure and a sieve member. The sieve member in a non-cleaning mode is inserted in the litter box until such time that the box requires removal of waste therefrom.

The base structure includes a bottom wall which is geometrically shaped and has one or more side walls extending upward from the bottom wall in an arrangement that leaves one side open, i.e., no wall extending upward from the bottom wall is present. The side wall can be a one piece curved wall or a plurality of flat adjoined walls so as to provide with the bottom wall, for example, a semi-circle, U-shape, square, triangle, rectangle, or other geometric shape with at least one side area remaining open to allow for insertion of the sieve member into the base structure as described below.

The bottom wall of the base structure includes a second portion extending outward from the open side of the base structure. This second portion is flat and is preferably a continuous extending piece of the bottom wall having the upstanding side wall(s). The extension forming the second portion of the bottom wall does not include side walls and is sized to allow a person to step at least partially on the extension at the time the litter box is to be cleaned as further described below.

The sieve member includes a screen or grid portion having a geometrical shape which allows for insertion of the screen or grid through the open wall of the base structure where the screen or grid portion will sit atop the bottom wall and inside the upstanding wall(s) of the base structure. The screen or grid portion is preferably complementary in shape to the shape of the bottom wall in the base structure. The screen or grid along an end thereof, which is present upon insertion in the base structure along the end of the bottom wall which does not include an upstanding wall (i.e., the open side), includes an upstanding wall which is constructed and arranged to serve as a back wall to substantially close the length of the open side of base structure. The wall of the sieve member, however, has a height sufficiently low that a pet can step or jump over the wall to enter the base structure for use. The other side wall or walls of the base structure are preferably higher to lessen the scattering of litter outside the base structure by a pet scratching in or moving around the litter.

Attached to or extending upward from the back wall of the sieve member is a handle member for manually moving the screen or grid for placement into and out of the base structure and for removal of waste from the base structure. The handle can be of a pre-determined length or height, or can include a mechanism to allow adjustment of the handle height to reduce the handle height when not in use or to customize the height of the handle to a user's height. The handle can include a grip portion, which can be upright, a curved or angled extension at the top free end of the handle such as in the manner of a cane handle, or the like to provide a comfortable and secure gripping surface. Further, the handle member can have a curved or angled body section to allow for a shift in the center of gravity to increase leverage and/or serve as a foot rest for assisting in placement of the sieve member in the base structure.

Preferably, one side end of the screen or grid may include a wall which only partially extends the length of the side end so as to leave an open space between the side wall and the back wall. This structure acts as a funnel when the sieve member is turned sideways to empty waste collected by the screen from the sieve member.

In use, a person by means of the handle member, inserts the screen portion of the sieve member into the base structure and allows it to sit atop the bottom wall. The back wall of the sieve member acts as a wall in the open wall section of the base structure. Litter is poured on top and over the screen of the sieve member to a desired depth. A pet can enter the base structure over the back wall of the sieve member and use the litter in a conventional manner. When waste is to be removed from the base structure, a person simply takes hold of the grip of the handle and lifts the sieve member out of the open top and open wall side of the base structure. As the sieve member is lifted, the clean litter passes through the openings in the screen or grid back into the base structure atop the bottom wall. Waste remains on top of the screen. As the sieve member is lifted, the member will get lighter in weight due to the litter sifting through the screen and back into the base structure. The sieve member is then tilted sideways with the back wall, and the side wall when present, of the sieve member serving to direct the waste into a trash receptacle. The screen portion of the sieve member is then reinserted into the base structure in a manner so that the litter is again atop the screen of the sieve member. The user will step on the extension to the bottom wall during this process so that the base structure does not move when the sieve member is inserted into the base structure by pushing the screen under the litter to again sit on the bottom wall beneath the litter. To further ease insertion of the screen under the litter during reinsertion of the sieve member into the base structure, the forward or leading end of the screen preferably has an inclined lip structure. Further, a foot rest or pedal can be positioned on the back of the handle or back wall of the sieve member, or the handle member can include an angled or curved portion therein, so the person can use foot pressure thereupon to push the screen portion into place.

Accordingly, the base structure can be cleaned of waste from the litter without the need to bend or kneel through a single upward lifting motion wherein the weight gets lighter as the sieve member is lifted. Reinsertion of the sieve takes minimal effort shoving the sieve member back into the base structure beneath the litter. This latter action can be eased through the use of body weight on the second portion of the bottom wall of the base structure, an included lip on the forward end of the screen to commence insertion, and the ability to use foot force or power to push the screen portion into the base structure.

The base structure is preferably made of one piece. The base structure can be made of plastic, cardboard, metal, wood, or other rigid material, or combination thereof. Alternatively, the base structure can be made of multiple components joined or interlocked together, such as by tape, inter-fitting edges, welding, or the like.

The sieve member is also preferably made of one piece. Alternatively, the sieve member can be made of multiple components joined or interlocked together, such as by tape, inter-fitting edges, welding, or the like. The sieve member can also be made of plastic, metal, or other rigid material, or combination thereof. The material selected must have sufficient rigidity to allow for insertion and removal to meet their intended functions.

BRIEF DESCRIPTION OF THE DRAWINGS

FIG. 1 is a perspective view of the base structure and the sieve member prior to insertion of the sieve member into the base structure.

FIG. 2 is a perspective view of the sieve member inserted into the base structure.

FIG. 3 is a perspective view of the base structure having litter therein.

FIG. 4 is a perspective view of the sieve member.

FIG. 5 is a first side view of the bottom half of the sieve member.

FIG. 6 is a back perspective view of the bottom half of the sieve member.

FIG. 7 is a perspective view of the sieve member inserted in the base structure with litter in the base structure on top of the screen portion of the sieve member.

FIGS. 8, 9 and 10 illustrate the sequence for using the sieve member to remove waste from the litter in the base structure. FIG. 8 illustrates the upward lifting by gripping of the handle portion (grip and person not shown) allowing sifting out of the litter during the raising action. FIG. 9 shows the retention of waste on the screen of the sieve member once all the litter has been sifted through the screen. FIG. 10 illustrates funneling the waste through a side opening in the sieve member into a trash receptacle.

FIGS. 11 and 12 illustrate reinsertion of the sieve member under litter in the base structure. In particular, FIG. 11 shows a user's foot on a foot rest or pedal on the rear of the handle to push forward the screen portion of the sieve member under the litter and shows the user's other foot on the extension from the bottom wall to hold the base structure in place. FIG. 12 shows the screen member inserted under the litter ready for further use.

FIG. 13 illustrates a cut-away view of a portion of a telescoping handle suitable for use in the sieve member to allow for adjustment in height of the handle.

FIG. 14 is a side view of a sieve member with a cane-shaped handle.

FIGS. 15, 16 and 17 show examples of alternate geometric shapes for the base structure and the screen portion of the sieve member. FIG. 15 shows a square. FIG. 16 shows a triangular shape. FIG. 17 shows a curved wall shape that can be modified to be a semi-circle, U-shape or the like.

FIG. 18 is a partial side view of the sieve member showing an extended and sloped side wall for an end of the screen portion which provides a funnel in combination with the back wall of the sieve member.

FIG. 19 shows an alternate handle member including an angled portion structured to shift the center of gravity and/or serve as a foot rest upon reinsertion of the sieve member in the base structure.

DETAILED DESCRIPTION OF THE INVENTION

The invention is directed to a combined litter box and sieve member which is pet friendly in use by not being an enclosed structure and provides for cleaning waste from the litter without the need for bending, kneeling or the like through minimal manual motions and lightweight lifting.

The combined litter box and sieve member includes a base structure and a sieve member. The base structure, and accordingly, the sieve member, can be of various geometric configurations to allow for variation in placement of the litter box within a household. Litter boxes are generally used for cats, although other household pets may be trained to use a litter box, such as small dogs, rabbits, ferrets, etc. Conventionally, litter boxes are rectangular to provide a larger space for the animal to move around. Cats generally scratch and/or move around the litter prior to and after use. The invention is described and illustrated herein for ease of discussion as a rectangular structure with the understanding that the alternative shapes may be utilized, such as a square, triangular, semi-circular, U-shaped, circular, etc. as also described and shown herein.

As shown in FIG. 1, the base structure includes a first portion 14a and a second portion 14b. First portion 14a is a bottom wall which defines an area which will, in use, contain the litter and receive the sieve member 12. The first portion 14a of the bottom wall will have one or more side walls extending upward from the free ends of the bottom wall leaving one side open through which the sieve member can be inserted. As shown in FIG. 1, the bottom wall 14a has three upraised walls 16, 17 and 18 and an open space extending between free side ends 16a and 18a of opposite walls 16 and 18. If the base structure were in the alternative shape of a semi-circle or the like, one curved wall could be used, such as in FIG. 17. If the alternative shape was triangular, two upraised flat walls would be used with the third side being open, such as shown in FIG. 16.

As shown in FIGS. 1 and 2, the sieve member 12 includes a screen or grid portion 20, a back wall 22 suitably attached to the back end of screen portion 20, and a handle 24. Handle 24 includes a grip 26. The grip can be upright as shown in FIGS. 1-4 or can be of alternative structures, such as a cane shape 28 as shown in FIG. 14. Further, the handle 24 can be of a single predetermined height (FIGS. 1-4 being shown with a broken section 24a to indicate that the selected height of the handle can vary) or can be a telescoping handle 30 as shown in FIG. 13. A suitable telescoping handle can have a plurality of holes 32 on an outer telescoping portion 34 for receiving a projection 36 on an inside telescoping portion 38 to allow for adjustment in height and a locking in place of the desired height. The adjustment in height can be used to minimize the height of the handle when not in use or to customize the height to a particular user. The handle can alternately have an angled or curved section, such as angled section 49 as shown in FIG. 19. This angled or curved section can be structured so as to shift the center of gravity to allow for easier lifting of the sieve member. The angled section can also serve as a foot rest as further described below.

The screen portion will have a mesh size which can be varied so long as the openings provided therein allow litter particles to pass therethrough while essentially retaining waste or clumps of litter on the top side of the screen when the screen is used to sift the litter to remove waste. The screen can be made of various materials (e.g., plastic or metal or combination of materials) and depending on the rigidity (i.e., strength) selected for the screen, a brace 40 may be included to provide additional rigidity (strength) to the screen. The handle 24 may be attached to the back wall 22 and/or the brace 40.

The screen portion 20 of the sieve member is sized to fit through the open side of the base structure as shown in FIG. 2. As shown in FIG. 3, the area within upraised side walls 16, 17, and 18 and on top of the first portion 14a of the bottom wall is filled with litter 42 as commercially available. In use, the sieve member 12 will be inserted in the base structure 10, with the litter 42 on top of the screen portion 20 of the sieve member as shown in FIG. 7.

Other features which are preferably present in the sieve member to facilitate ease of use of the sieve member are side wall 44, inclined lip 46, and foot rest or pedal 48 or angled or curved portion 49. The side wall 44 extends a portion of the length of one end of the screen portion 20 leaving an opening 50 between one end 52 of wall 44 and one end 54 of back wall 22. This provides a funnel structure for emptying waste collected by and on screen 20 as further described below. Optionally, a wall in the manner of wall 44 can be present on each side end of the screen 20 to allow for ease of disposal in either direction. Inclined lip 46 is along the front or leading edge of screen 20 and facilitates insertion of the screen 20 of sieve member 12 under the litter contained in base structure 10 as also further described below. Foot rest 48, and angled/curved portion 49, are another means to facilitate reinsertion of screen 20 under litter 42 as further described below. Lip 46 can be provided in one piece as part of screen 20 or can be a separate piece attached to the leading edge of screen 20.

The use of the combined base structure and sieve member will now be described. The sieve member 12 is inserted in base structure 10 with screen 20 positioned on top of first portion 14a of bottom wall 14 as shown in FIG. 2. Litter 42 is poured over screen 20 and bottom wall portion 14a into the area bounded by walls 16, 17, 18 and 22 as shown in FIG. 7. A pet will use the litter in base structure 10 to urinate and/or defecate leaving waste product in the form of litter-absorbed liquid or solids. The litter is periodically cleaned of these materials to remove odor, unsightly waste and to make the litter box conducive to re-use. To clean the litter and remove the waste product, a user holds the handle 24 at grip 26 or otherwise as comfortable and lifts the sieve member 12 thereby raising screen 20. The raising action allows clean litter to sift through the openings in the mesh of screen 20 back into the base structure as shown in FIG. 8 with the waste product 56 being retained on top of screen 20 as shown in FIG. 9. The sieve member can then be tilted to the side, preferably including side wall 44, to direct the waste product 56 out one side of sieve member 12 into a trash receptacle 58 or other appropriate place for disposal. Wall 44 can be extended in length and sloped towards opening 50, as shown in FIG. 18, to enhance the funneling and collection of waste for removal through opening 50.

Following disposal of the collected waste, the sieve member is reinserted into the base structure 10 for continued use. For reinsertion with reference to FIGS. 11 and 12, the user's body weight through placement of a foot 60 on the second portion 14b of the bottom wall is used to maintain base structure 10 in place. The sieve member is then slid forward to insert the screen 20 under the litter 42. This is facilitated by inclined lip 46 (when preferably present) and foot rest 48 or angled/curved portion 49 in handle member 24. The inclined lip eases entry of screen 20 under litter 42. The user places a foot 62 on foot rest 48 or section 49 and thereby pushes sieve member 12 forward with screen 20 being inserted in base structure 10 under litter 42, see FIG. 12. The sieve member can either be pushed forward to essentially abut wall 17 and inward of the free edges of side walls 16 and 18 as shown in FIG. 12 to provide a smaller area for when have a smaller animal using the litter box, or the sieve member 12 does not have to be inserted fully forward thereby aligning wall 22 with free side ends 16a and 18a of walls 16 and 18 or leaving a portion of screen 20 on surface 14*b* (not shown), to provide a larger area for the litter when have multiple animals or a larger animal using the litter box.

In the construction of base structure 10, the structure is preferably one piece and made of plastic. This provides for easiest maintenance and cleanliness. However, as would be known to one skilled in the art, the base structure can be constructed of multiple components suitably connected if desired. The same follows for sieve member 12. The screen, back wall and handle of sieve member 12 may be cast as one piece or multiple components as applicable. The dimension of the base structure and sieve member can vary depending on how big or small a structure is desired, and the shape or configuration selected for the overall device to have.

A preferred example of the invention in rectangular form has the following dimensions (it being understood that the dimensions are approximate and can be varied to accommodate manufacturing tolerances and the like):

(1) Sieve member 12—
  (a) screen 20—14 inches×16 inches
    —inch mesh
  (b) handle 24—40 inches (or adjustable within this range or a greater range)
  (c) side panel 44—4 inches×5 inches
  (d) rear panel 22—4 inches×16 inches
  (e) foot rest 48—3 inches×1 inch
  (f) front lip 46—1 inch×16 inches
(2) Base structure 10—
  (a) bottom wall portion 14*a*—17 inches wide×15 inches deep
  (b) bottom wall portion 14*b*—17 inches wide×16 inches deep
  (c) side wall 17—17 inches wide×10 inches tall
  (d) side walls 16 and 18—15 inches wide×10 inches tall.

Exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A pet litter box comprising, in combination:
  (a) a base structure comprising
    (i) a first bottom wall having a first perimeter defining an interior area of the first bottom wall,
    (ii) at least one side wall which adjoins and extends upward from a substantial portion of the first perimeter of the first bottom wall so as to leave a portion of the first perimeter free, on the first bottom wall, of said at least one side wall, and wherein said at least one side wall does not extend beyond said first perimeter,
    (iii) a second bottom wall extending continuously from or in an abutting joined manner outward from said first bottom wall in said portion of the first perimeter which is free of said at least one side wall, wherein said second bottom wall does not include upstanding side walls and is not directly connected to said at least one side wall;
  (b) a sieve member comprising
    (i) a horizontally planar sifting portion, wherein the sifting portion has a second perimeter smaller than said first perimeter of the first bottom wall and has a configuration which allows insertion of the sifting portion through the portion of the first perimeter free of said at least one side wall,
    (ii) a back wall extending upward from one end of the sifting portion so that when the sifting portion is within the base structure the back wall substantially fills said portion of the first perimeter free of said at least one side wall; and
    (iii) a handle member extending upward of the sifting portion and the back wall.

2. The litter box of claim 1 wherein said at least one side wall is a one piece wall.

3. The litter box of claim 1, wherein said at least one side wall is a plurality of walls.

4. The litter box of claim 1, wherein said first bottom wall and said second bottom wall are one piece.

5. The litter box of claim 4, wherein a fold line is present between said first bottom wall and said second bottom wall.

6. The litter box of claim 1, wherein said first bottom wall and said second bottom wall are separate adjoined pieces.

7. The litter box of claim 1, wherein said handle member is adjustable in height.

8. The litter box of claim 1, wherein said handle member has an outward grip extension at a top thereof.

9. The litter box of claim 1, wherein said sieve member has an inclined lip surface along a leading edge of the sifting portion.

10. The litter box of claim 1, wherein said sieve member includes at least one side wall extending upward from a portion of a side edge of said sifting portion, such that an opening is provided between said at least one side wall of said sieve member and said back wall of said sieve member.

11. The litter box of claim 1 wherein said handle member includes a foot rest as a part thereof or connected thereto.

12. The litter box of claim 1 wherein said handle member includes a body portion, wherein said body portion includes an angled section or a curved section.

* * * * *